Dec. 16, 1930.                E. W. PATTERSON                1,785,095
                            FLEXIBLE PIPE ASSEMBLY
                     Filed June 6, 1929        2 Sheets-Sheet 2
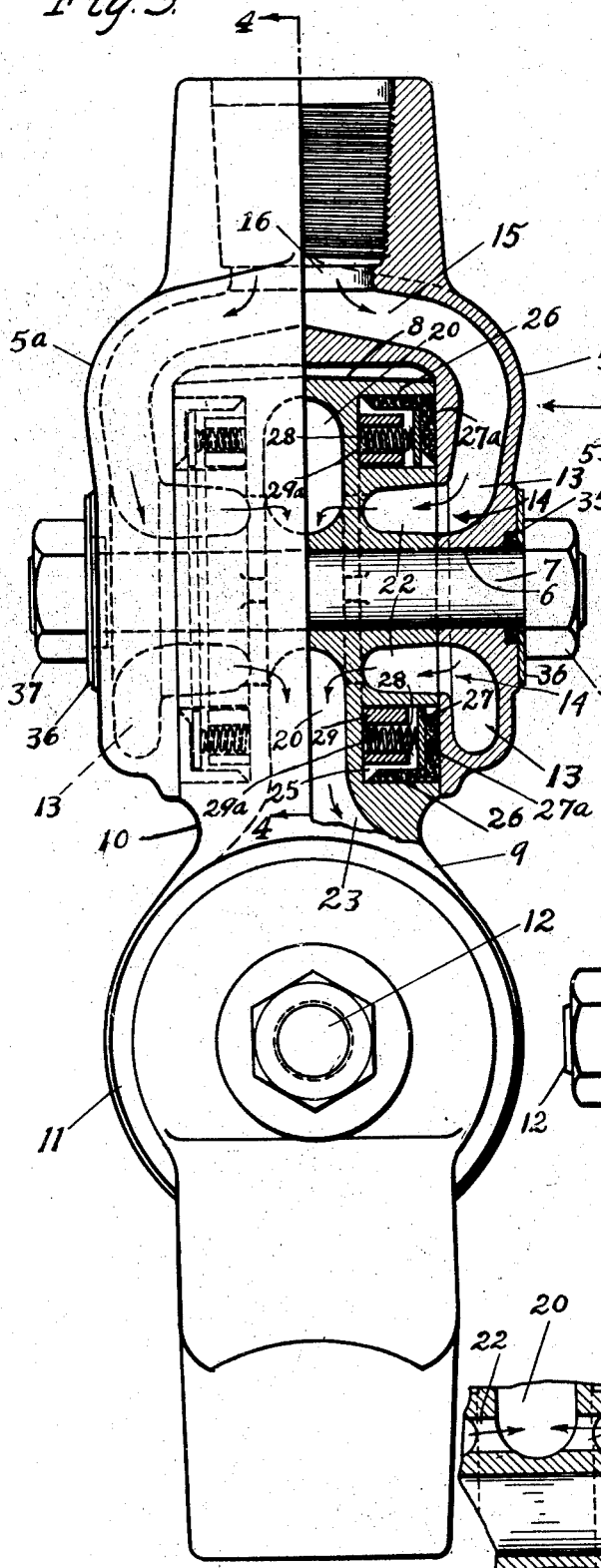
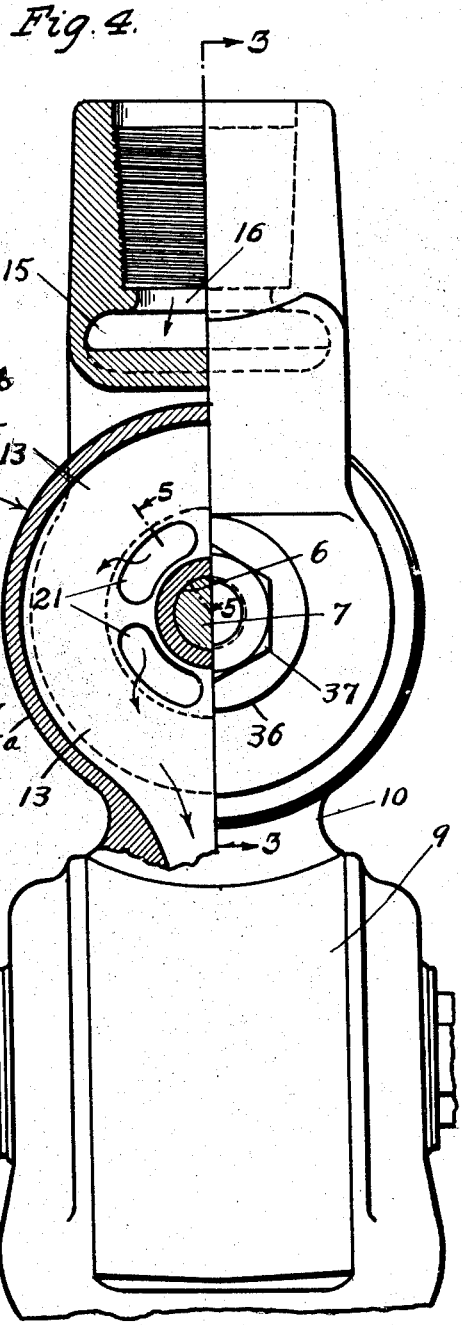
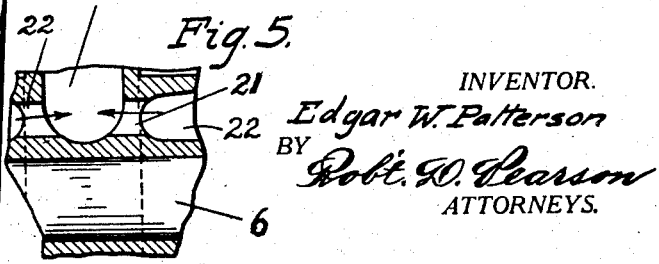
INVENTOR.
Edgar W. Patterson
BY
Robt. W. Pearson
ATTORNEYS.

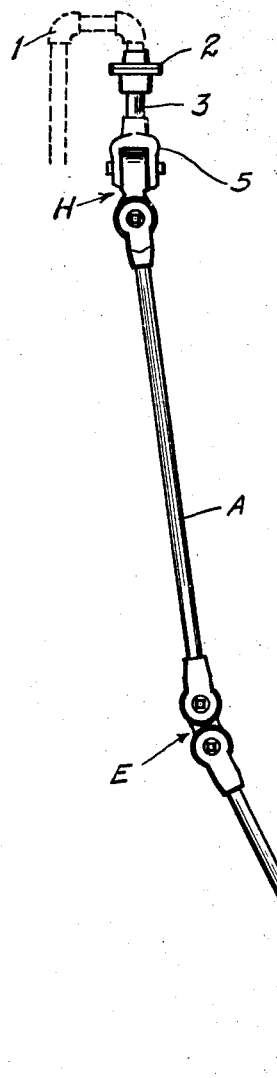
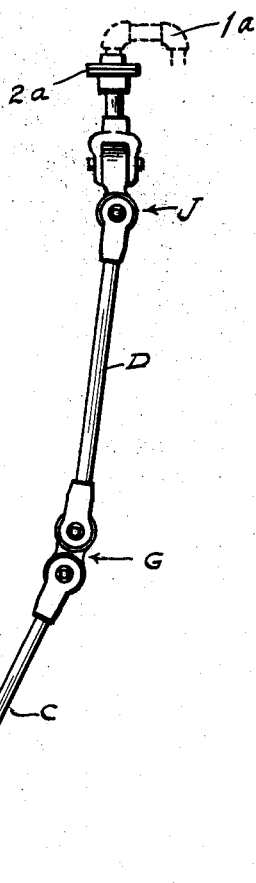

Patented Dec. 16, 1930

1,785,095

UNITED STATES PATENT OFFICE

EDGAR W. PATTERSON, OF LOS ANGELES, CALIFORNIA, ASSIGNOR, BY DIRECT AND MESNE ASSIGNMENTS, TO WALTER P. LACY, WILLIAM G. LACY, AND C. A. STILES

FLEXIBLE PIPE ASSEMBLY

Application filed June 6, 1929. Serial No. 368,937.

This invention relates to an adjustable pressure pipe for hydraulic pipe equipment.

An object of the invention is to generally improve upon and simplify the pressure pipe construction to which the invention pertains.

Another object of the invention is to provide the pressure pipe with a superior liquid conducting joint construction which will permit the pressure pipe to be flexed and adjusted as desired without the same being caused to leak.

Still another object of the invention is to provide a liquid tight but easily flexed pipe joint construction wherein the hydraulic pressure upon the working parts of the joint will be balanced in such a manner as to overcome undesirable friction, thus reducing wear and permitting easy manual flexion of the joint even when the latter is being used to conduct a stream of liquid under heavy hydraulic pressure.

Other objects and advantages may hereinafter appear.

Referring to the accompanying drawings which illustrate what is at present deemed to be a preferred embodiment of the invention, Fig. 1 is a side elevation of the complete pressure pipe construction in a position which it may assume during use.

Fig. 2 is a plan view of the pressure pipe on a reduced scale to illustrate the positioning thereof, part of the well drilling equipment being shown in dotted lines.

Fig. 3 is a view showing on an enlarged scale, partly in elevation and partly in midsection on line 3—3 of Fig. 4, one of the joint constructions of the pipe.

Fig. 4 is a view similar to Fig. 3 except that the view is taken at an angle of ninety degrees with relation to the viewpoint in Fig. 3, the sectioned portion of the view being on line 4—4 of Fig. 3.

Fig. 5 is a fragmental section on line 5—5 of Fig. 4.

Referring in detail to the drawings, the pressure pipe is made up of a plurality preferably of straight pipe sections A, B, C, D, of which, in the embodiment illustrated in the drawings, the pipe sections B and C are the intermediate sections and the sections A and D are the terminal ones. The pipe sections A and B are connected by the hinge joint construction E, the sections B and C are connected by the hinge joint construction F, and the sections C and D are connected by hinge joint section G. These joint constructions are desirably all of the same design. Terminal universal joints H and J are also provided, their internal construction being shown in Figs. 3 and 4.

The supply pipe 1 which leads from pump P, is connected by means of a standard swivel pipe joint 2 and pipe nipple 3 to the intake portion of the joint member 5 shown in detail in Figs. 3 and 4. At the other end of the device a standard swivel pipe joint 2a makes connection with the out pipe 1a. 50 designates the derrick floor and 51 the usual rotary table.

The intake end of the pipe line shown in Fig. 1 is provided with a universal joint construction H and the outlet end of said pipe line is provided with a like universal joint construction J, Figs. 1 and 2 showing these joint constructions in detail.

Referring to the construction shown in Figs. 3 and 4, the bifurcated member 5 of the universal joint there shown is provided with a bore 6 to receive a pivot bolt 7. Between the bifurcations 5a and 5b of said joint member 5, is fitted with a fluid tight working fit, a twin internal joint member consisting of an upper head 8 and a lower head 9 said heads being united by a neck 10. In the illustrated embodiment of the invention the heads 8 and 9 of said internal joint member are identical in construction, therefore it will be necessary to describe in detail only the head 8 which is fitted between the bifurcations 5a and 5b of the external joint member 5.

In the position of the parts shown in Fig. 3 the lower internal head 9 is fitted between the bifurcations of a lower external joint member 11. Said joint member 11 has the same internal construction as the upper external joint member 5, said head 9 being fitted between its bifurcations with a working fit and held in place by a pivot bolt 12.

The internal construction of both the bifurcations of the joint member 5 is the same and therefore it will be sufficient to describe in detail only the construction of the bifurcations 5b. Said bifurcation is provided with an annular passage 13 which surrounds the pivot bolt 7 in spaced relation thereto and which has an annular mouth 14 also extending around pivot bolt 7, said mouth opening out through the inner face of the bifurcation. A broad channel 15 affords communication between said annular passage 13 and the intake port 16.

The internal joint head 8 is provided with a central annular passage 20 which extends around bolt 7 in spaced relation thereto. Elongated ports 21 lead from opposite sides of said annular passage 20 to the innermost parts of annular grooves 22 which are formed in each of the sides or faces of the head 8 concentrically of pivot bolt 7 and in spaced relation to said bolt.

Each annular groove 22 is in constant communication with the mouth 14 of the channel 13 at that side of the device, so that fluid may be conducted by said channel 13 from the intake port 16 to the annular passage 20. From said annular passage 20 the liquid flows through the outlet 23 to the interior of the lower head 9 of the internal joint member.

An annular packing chamber 25 is channeled out at each side of the casing head 8, wherein is placed a ring of packing material 26 which is L-shaped in cross-section, the angle of the L being directed radially outward and toward the mouth of the channel.

A follower ring 27 is arranged to be pressed by coiled compression springs 28 against the limb 27a of the L which extends across the mouth of the packing chamber 25. Said springs are seated in annular ring 29 wherein are drilled seats 29a for them.

A packing gland or ring 35 is provided for each end of the pivot bolts, one of said rings being shown in Fig. 3. Against said gland rests a washer 36 which is engaged by a nut 37 of the bolt, the construction preferably being identical at each end of both of said bolts.

Claims:

1. In a flexible pipe assembly, a swivel joint comprising a head having a pivot aperture extending therethrough from side to side thereof, each end of said aperture opening out at the central portion of a bearing face at that side of the head, a circular groove cut into each of said faces in radially spaced relation to said pivot hole, there being, between the bottoms of the grooves thus formed, a circular passage within said head extending around its aforesaid pivot hole in spaced relation thereto, there also being ports affording communication between each of said grooves and said circular passage, said head having an extension formed as a part thereof and provided with a passage adapted for delivery or intake in communication with said circular passage of said head; and a bifurcated pipe joint member having bifurcations with internal bearing faces each of which are adapted to engage one of the faces of said head with a working fit, each bifurcation being provided with passages which open through said face of the bifurcated member and are at all times in communication with the aforementioned circular groove at that side of said head; and a pivot bolt maintaining said head in the operative position between said bifurcations.

2. In a flexible pipe assembly, a swivel joint comprising a head; and a bifurcated pipe joint member having bifurcations between which said head is pivotally mounted with a working fit, there being a circular groove in each side of said head in radially spaced relation to the pivotal mounting thereof, there being between the bottoms of these grooves a circular passage within said head extending around and in spaced relation to the pivotal mounting thereof, there also being ports affording communication between each of said grooves and said circular passage, each of the bifurcations of said bifurcated member having a conduit passage which is in constant communication with the aforementioned grooves of said head.

3. In a flexible pipe assembly, a swivel joint comprising a head; and a bifurcated pipe joint member having bifurcations between which said head is pivotally mounted with a working fit, there being a circular groove in a side of said head in radially spaced relation to the pivotal mounting thereof, there being, in spaced relation to the bottom of said groove, a circular passage within said head extending around and in spaced relation to the pivotal mounting thereof, there also being ports affording communication between said groove and said circular passage, a bifurcation of said bifurcated member having a passage which is in communication with said groove, through a plurality of ports.

In testimony whereof I hereby affix my signature.

EDGAR W. PATTERSON.